(12) United States Patent
Jansen et al.

(10) Patent No.: US 11,204,410 B2
(45) Date of Patent: Dec. 21, 2021

(54) RADAR-BASED COMMUNICATION

(71) Applicant: NXP B.V., Eindhoven (NL)

(72) Inventors: Feike Guus Jansen, Eindhoven (NL);
Francesco Laghezza, Eindhoven (NL);
Franz Lampel, Eindhoven (NL)

(73) Assignee: NXP B.V., Eindhoven (NL)

( * ) Notice: Subject to any disclaimer, the term of this patent is extended or adjusted under 35 U.S.C. 154(b) by 359 days.

(21) Appl. No.: 16/272,083

(22) Filed: Feb. 11, 2019

(65) Prior Publication Data

US 2020/0256948 A1 Aug. 13, 2020

(51) Int. Cl.
| | | |
|---|---|---|
| *G01S 7/35* | (2006.01) | |
| *G01S 13/34* | (2006.01) | |
| *G01S 13/931* | (2020.01) | |
| *G01S 13/87* | (2006.01) | |
| *G01S 7/02* | (2006.01) | |

(52) U.S. Cl.
CPC .............. *G01S 7/352* (2013.01); *G01S 7/023* (2013.01); *G01S 13/34* (2013.01); *G01S 13/87* (2013.01); *G01S 13/931* (2013.01); *G01S 7/356* (2021.05)

(58) Field of Classification Search
CPC .......... G01S 7/352; G01S 7/023; G01S 13/34; G01S 13/343; G01S 13/87; G01S 13/931; G01S 2007/356
See application file for complete search history.

(56) References Cited

U.S. PATENT DOCUMENTS

| | | | | |
|---|---|---|---|---|
| 3,798,590 A | * | 3/1974 | Jacobson | G01S 13/34 367/90 |
| 4,309,703 A | * | 1/1982 | Blahut | G01S 13/286 342/201 |
| 4,333,080 A | * | 6/1982 | Collins | G01S 13/282 342/194 |
| 5,298,962 A | * | 3/1994 | Nourrcier | G01S 17/34 356/5.09 |
| 5,926,125 A | * | 7/1999 | Wood | G01S 13/106 342/25 F |

(Continued)

OTHER PUBLICATIONS

Lampel, F. et al. "A Performance Enhancement Technique for a Joint FMCW RadCom System", Information and Communication Theory Lab, Signal Processing Systems, EuRAD 2019—2019 16th European Radar Conference, pp. 169-172 (Oct. 2019).

(Continued)

*Primary Examiner* — Peter M Bythrow (57) ABSTRACT

Aspects of the present disclosure are directed to a method and/or apparatus involving frequency modulated continuous wave (FMCW) radar signals. As my be implemented in accordance with one or more embodiments, receiver circuitry is configured and arranged to receive a FMCW radar signal having an information signal embedded into a radar waveform, and to indicate a relationship in the FMCW radar signal between beat frequency magnitude and time delay. A filter processing circuit is configured and arranged to filter the information signal in the FMCW radar signal by applying a group delay function based on the relationship between beat frequency magnitude and time delay. Signal processing circuitry is configured and arranged to detect a remote object by using the filtered FMCW radar signal.

20 Claims, 6 Drawing Sheets

(56) References Cited

U.S. PATENT DOCUMENTS

| | | | | | |
|---|---|---|---|---|---|
| 6,373,427 | B1* | 4/2002 | Hohne | ............... | G01S 7/354 |
| | | | | | 342/128 |
| 7,221,308 | B2* | 5/2007 | Burton | ............... | G01S 13/765 |
| | | | | | 342/179 |
| 8,866,667 | B2* | 10/2014 | Vacanti | ............... | G01S 13/882 |
| | | | | | 342/120 |
| 9,660,605 | B2* | 5/2017 | Tinsley | ............... | G01S 13/882 |
| 9,853,365 | B2* | 12/2017 | Kumar | ............... | G01S 7/35 |
| 10,613,193 | B2 | 4/2020 | Kim et al. | | |
| 2002/0198650 | A1* | 12/2002 | Baugh | ............... | G01S 13/878 |
| | | | | | 342/451 |
| 2005/0156780 | A1* | 7/2005 | Bonthron | ............... | G01S 13/931 |
| | | | | | 342/107 |
| 2009/0309780 | A1* | 12/2009 | Albert | ............... | G01S 13/876 |
| | | | | | 342/47 |
| 2011/0122014 | A1* | 5/2011 | Szajnowski | ............... | G01S 13/26 |
| | | | | | 342/109 |
| 2011/0187586 | A1* | 8/2011 | Cornic | ............... | G01S 13/343 |
| | | | | | 342/196 |
| 2013/0050013 | A1* | 2/2013 | Kobayashi | ............... | H03L 7/093 |
| | | | | | 342/118 |
| 2013/0214963 | A1* | 8/2013 | Vacanti | ............... | G01S 13/882 |
| | | | | | 342/120 |
| 2016/0124075 | A1* | 5/2016 | Vogt | ............... | G01S 13/325 |
| | | | | | 342/13 |
| 2016/0245909 | A1* | 8/2016 | Aslett | ............... | G01S 7/4056 |
| 2017/0219689 | A1* | 8/2017 | Hung | ............... | G01S 7/023 |
| 2018/0003799 | A1* | 1/2018 | Yang | ............... | G01S 13/93 |
| 2018/0031688 | A1* | 2/2018 | Hesse | ............... | G01S 13/931 |
| 2018/0074168 | A1* | 3/2018 | Subburaj | ............... | G01S 13/88 |
| 2018/0095162 | A1* | 4/2018 | Fetterman | ............... | G01S 7/023 |
| 2018/0095173 | A1* | 4/2018 | Kurono | ............... | G01S 7/352 |
| 2018/0113191 | A1* | 4/2018 | Villeval | ............... | G01S 13/931 |
| 2018/0136328 | A1* | 5/2018 | Moss | ............... | G01S 13/584 |
| 2018/0306913 | A1* | 10/2018 | Bartels | ............... | G01S 7/03 |
| 2019/0120933 | A1* | 4/2019 | Kurashige | ............... | G01S 7/4008 |
| 2019/0361113 | A1 | 11/2019 | Ray | | |

OTHER PUBLICATIONS

P. Barrenechea, F. Elferink and J. Hanssen, "FMCW Radar with broadband communication capability", Proc. of the 4th European Radar Conference, Munich, Germany, Oct. 2007, pp. 130-133.

Z. Zhang, M. J. Nowak, M. Wicks, and Z. Wu, "Bio-inspired RF steganography via linear chirp radar signals", IEEE Communications Magazine, Jun. 2016, vol. 54, No. 6, pp. 82-86.

R. Feger, H. Haderer and A. Stelzer, "Optimization of codes and weighting functions for binary phase-coded FMCW MIMO radars", Proc. IEEE MTT-S Intl. Conf. on Microwaves for Intelligent Mobility, San Diego, CA, USA, May 19-20, 2016.

C. Sahin, J. Jakabosky, P. M. McCormick, J. G. Metcalf and S. D. Blunt, "A novel approach for embedding communication symbols into physical radar waveforms", Proc. 2017 IEEE Radar Conf., Seattle, WA, USA, May 8-12, 2017, pp. 1498-1503.

U.S. Appl. No. 16/865,824, filed May 4, 2020, entitled: Predistortion Technique for Joint Radar/Communication Systems. The Examiner is referred to the copending patent prosecution of the common Applicant (no attachment).

U.S. Appl. No. 17/505,434, filed Oct. 19, 2021, entitled Radar Apparatus and Method With Content Embedded in the Radar Signal.

* cited by examiner

RADAR-BASED COMMUNICATION

Aspects of various embodiments are directed to radar-based signaling, as may involve embedding information within a radar signal.

Radar systems are utilized in a variety of applications for ascertaining environmental characteristics, such as those which may relate to distance, position or speed. For instance, automotive and other vehicle systems may utilize radar to ascertain distance between a vehicle using the radar and objects and/or other vehicles. Generally, the distance that a radar signal, such as sound, light or other radiation, travels is used to characterize the environment. A round-trip distance that a radar signal travels from a transmitter to an object and (as reflected from the object) back to a receiver can be determined based upon characteristics of the signal and the medium in which the signal travels.

Using an automobile as an example, a signal can be modulated according to a specific waveform principle (e.g., a frequency modulated continuous wave (FMCW) signal). Such a signal may be transmitted at a predetermined carrier frequency, and reflected signals can be detected and used to determine a distance to an object. The transmission frequency of a continuous radar signal may be modulated in the form of ramps, and a baseband signal can be generated from a received signal by mixing with the transmitted signal. Such approaches can be used, for example, for sensing distance to an object, or sensing a velocity at which an object or vehicle is moving, as well as relative positioning (e.g., an angle between an object and a vehicle).

While such approaches have been very useful, many radar systems, high resolution and long measurement range can be challenging to achieve. Further, many environments benefit from the communication of data within signals. However, data communication with radar signals can be challenging to implement, while also maintaining desirable radar operation. For instance, data may complicate a radar signal, making the radar signal challenging to process.

These and other matters have presented challenges to radar-based implementations, for a variety of applications.

SUMMARY

Various example embodiments are directed to issues such as those addressed above and/or others which may become apparent from the following disclosure concerning data communication within other signals, such as within radar signals.

In certain example embodiments, aspects of the present disclosure involve filtering (e.g., removing) an information portion of a radar signal that includes data, from the radar signal, and further utilizing the radar signal for ascertaining distance. In particular embodiments, a combined radar and communication system involves embedding an information signal into a radar waveform, and filtering the information from the radar waveform as reflected from an object. The filtering may be based on a relationship between beat frequency and time delay for a frequency modulated continuous wave (FMCW) radar system. Such approaches may be implemented in automotive (or other vehicle) radar, advance driver assistance systems, and joint radar-communication.

As may be implemented in accordance with one or more embodiments, an apparatus includes receiver circuitry, a filter processing circuit and signal processing circuitry. The receiver circuitry is configured to receive a FMCW radar signal having an information signal embedded into a radar waveform, and to indicate a relationship in the FMCW radar signal between beat frequency magnitude and time delay. The filter processing circuit is configured to filter the information signal in the FMCW radar signal by applying a group delay function based on the relationship between beat frequency magnitude and time delay. The signal processing circuitry is configured to detect a remote object by using the filtered FMCW radar signal.

In another particular embodiment, a radar-communication apparatus includes transmitter circuitry configured to embed an information signal into a radar waveform, and to transmit the radar waveform with the information signal embedded therein. The apparatus further includes receiver circuitry configured to receive the radar waveform as transmitted from the transmitter circuitry and reflected from an object, and to filter the information signal from the received radar waveform, based on characteristics of the transmitted radar waveform, therein providing a filtered radar waveform. The receiver circuitry (e.g., in conjunction with logic circuitry) detects a distance characteristic of the object using the filtered radar waveform.

A method-based embodiment is directed to an approach carried out by at least one of multiple radar devices being used in a radar-communication system, each including radar device including radar communication circuitry. A FMCW radar signal having an information signal embedded into a radar waveform is received and, in response thereto, a relationship is indicated in the FMCW radar signal between beat frequency magnitude and time delay. The information signal is filtered from the FMCW radar signal by applying a group delay function based on the relationship between beat frequency magnitude and time delay. For instance, such a filter function may align signals in time, which can be "derotated" according to the information signal. The FMCW radar signal is then signal processed with the information signal filtered therefrom to detect a remote object.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving signaling such as that involving radar signals. In certain implementations, aspects of the present disclosure have been shown to be beneficial when used in the context of communicating data with radar signals, and in the context of detecting distance (e.g., to a remote object) from the radar signals. In various embodiments, information is embedded in radar signals and transmitted for reception by remote receivers. A reflected one of the radar signals received back at the source that transmitted the one of the radar signals is filtered to remove the data prior to processing for detecting distance based on the reflected nature of the one of the radar signals. Such approaches may, for example, facilitate vehicle-to-vehicle communication within a radar signal that one of the vehicles also utilizes for detecting distance. While not necessarily so limited, various aspects may be appreciated through the following discussion of non-limiting examples which use exemplary contexts.

As may be implemented in accordance with one or more embodiments, a combined radar and communication system embeds an information signal into a radar waveform, and further filters the information signal from a reflection of the radar waveform from an object. Such an approach may involve matched filter processing that exploits a relationship between beat frequency and time delay in a FMCW radar system.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it should be appreciated that features from one figure or embodiment can be combined with features of another figure or embodiment even though the combination is not explicitly shown or explicitly described as a combination.

As consistent with the above, various embodiments are directed to combining simultaneous radar and communication functionality in the same spectrum. One such approach involves embedding an information signal into a FMCW radar signal by phase coding the FMCW radar signal. In a specific embodiment, the phase of a linear frequency ramp of the FMCW radar signal is changed several times according to the information signal during the ramp period, which embeds the information signal into the FMCW radar signal. On the radar receiver side, the information signal is removed before radar processing. The information signal may be removed by applying a filter with a group delay function that approximates the relationship between beat frequency and time delay for a FMCW radar system in which the FMCW radar signal is communicated. After filtering, the phase of the signal is derotated according to the embedded information signal and radar signal processing is then executed.

Various embodiments as characterized herein are applicable for implementation with a relatively low data modulation rate that facilitates compensation for phase coding using straightforward multiplication with the complex conjugate of the modulating phase code. Such an approach may be implemented where the modulation period is much longer than the round-trip delay time of radar echoes. Interference cancellation can be used to determine the phase of each FMCW sweep in a series of frequency modulation ramps according to mutually orthogonal phase code sets. When a higher bit rate is required, the performance of the radar signal can be restored by compensating for (e.g., removing) the communication content of the FMCW signal.

In various embodiments, a compensation scheme that exploits correspondence between beat frequencies at a baseband frequency (proportional to round-trip delays) is utilized. Time delay can be equal to a linear phase shift in the frequency domain. Each received signal has its own beat frequency, and a filter approximates a linear frequency shift over a frequency range roughly equal to the bit rate of the information signal. An all-pass filter with a linear group delay proportional to the beat frequency can be applied to all the received chirps.

Certain embodiments are directed to utilizing a joint radar and communication signal where a transmitted complex analytic signal is given as:

$$s_{TX}(t) = \sqrt{P_{Tx}} \exp(j\theta(t) + \psi(t, I)) rect\left(\frac{t}{T_{ramp}}\right)$$

where θ(t) is the linear frequency modulated (LFM), also called chirp, signal of the radar and describes the instantaneous phase of the radar signal and is given as:

$$\theta(t) = 2\pi\left(f_c t + \frac{\alpha}{2} t^2\right)$$

where α=B/T_ramp is the slope of the LFM signal, B is the RF frequency deviation and T_ramp its duration, respectively. The LFM signal can be considered as a time dependent carrier of the embedded phase modulated communication signal ψ(t,I), where I represents an information sequence.

As may be implemented with certain embodiments, five bits per chirp are used to embed communications, such that a linear group delay (no quadratic phase distortions) holds. Signals (e.g., reflections from different objects) can then be aligned and a communication signal can be removed therefrom. In the case of a communication system, the receiving end synchronizes to the transmitted signal, in which synchronization in time delay, start frequency and frequency ramp can be utilized to remove an LFM signal and decode an information signal.

As may be implemented in accordance with one or more embodiments, a radar signal communication apparatus utilizes receiver circuitry that receives a FMCW radar signal having an information signal embedded into a radar waveform, and that indicates a relationship in the FMCW radar signal between beat frequency magnitude and time delay. A filter processing circuit filters the information signal in the FMCW radar signal (e.g., for removing the information signal from the FMCW radar signal) by applying a group delay function based on the relationship between beat frequency magnitude and time delay, and signal processing circuitry detects a remote object using the filtered FMCW radar signal. In this context, a radar signal bearing data can be utilized to efficiently and accurately assess radar signals for detecting objects. In certain embodiments, the group delay function is based on the beat frequency magnitude as related to a linear group delay, and the filter processing circuit applies the group delay function to all chirps associated with the received FMCW radar signal.

In various implementations, the radar signal communication apparatus includes transmitter circuitry that generates and transmits the FMCW radar signal to communicate the information signal embedded in the radar waveform to remote receiver circuitry and to provide the FMCW radar for receipt by co-located receiver circuitry for ascertaining distance. Such transmitter circuitry may embed information signals into a radar waveform having plurality of frequency ramps, by embedding multiple information symbols into each frequency ramp in which information symbols embedded into respective ones of the frequency ramps are different. In this context such a transmitter may be implemented in a common radar device that transmits the FMCW radar signal with the information signal embedded therein, for use in determining object distance via radar-based aspects and for reception by other remote receivers that process the embedded information signal for communications. Such transmitter circuitry may also be part of a remote device that transmits the FMCW radar signal with the information signals embedded therein, which are processed as noted above with the receiver circuitry.

The information signal may be embedded using a variety of approaches, such as by phase coding the information signal. In some embodiments, the signal is embedded into the radar waveform with a plurality of frequency ramps and multiple information symbols embedded into each frequency ramp. The information symbols embedded into respective ones of the frequency ramps can be different for carrying different information. In certain embodiments, the information signal in the FMCW radar signal is associated with communication symbol durations, each of which is longer than an expected round-trip delay time of radar echoes detectable by the signal processing circuitry. The beat frequency manifests in the frequency spectrum of a baseband signal of the FMCW radar signal and is proportional to an expected round-trip delay time of radar echoes.

The filter processing circuit and signal processing circuitry can be implemented in a variety of manners, to suit particular applications. In some embodiments, the filter processing circuit and the signal processing circuitry process the FMCW radar signal based in part on a time delay relating to expected round-trip delay time of radar echoes corresponding to a linear phase shift in terms of frequency domain analysis. In certain embodiments, the signal processing circuitry applies a phase-derotation process, based on the information signal, to an output from the filter processing circuit. Radar processing circuitry may be further utilized to provide radar signaling analysis of the output from the filter processing circuit after application of the phase-derotation process. In some implementations in which the FMCW radar signal includes modulation periods that are longer than an expected round-trip delay time of radar echoes detectable by the signal processing circuitry, the filter processing circuit effects interference cancellation based on a phase of each of multiple FMCW sweeps in a series of frequency modulation ramps according to mutually orthogonal phase code sets.

In various embodiments, the radar signal communication apparatus is a radar-communication system including a first radar device having the receiver circuitry and the filter processing circuit and a second radar device, at least one of the first radar device and the second radar device having full-duplex radar communications circuitry. The first radar device may include a signal-transmission circuit that transmits another FMCW radar signal concurrently causing the first radar device to respond by detecting the object and causing a transmission signal to be sent to the second radar device.

In another particular embodiment, a radar-communication apparatus includes transmitter circuitry that embeds an information signal into a radar waveform and transmits the radar waveform with the information signal embedded therein. Receiver circuitry receives the radar waveform as transmitted from the transmitter circuitry and reflected from an object, and filters the information signal from the received radar waveform based on characteristics of the transmitted radar waveform, therein providing a filtered radar waveform. The receiver circuitry (e.g., in conjunction with and/or including logic circuitry) detects a distance characteristic of the object using the filtered radar waveform. The receiver circuitry may be coupled to the transmitter circuitry (e.g., co-located in a common radar device) for receiving information depicting a characteristic of the transmitted radar waveform, and filters the information signal based on the characteristic of the transmitted radar waveform. In some embodiments, the receiver circuitry receives radar waveforms transmitted from remote transmitters that also embed an information signal into a radar waveform, and processes the waveforms transmitted from the remote transmitters to extract data in the information signal from each of the remote transmitters. Such an approach may be amenable to implementation with vehicle-to-vehicle communications in which the transmitting vehicles also utilize reflections of the signals to assess characteristics of the environment such as the location, position or speed of objects in the environment.

In a particular embodiment, the transmitter circuitry embeds multiple information symbols into each of a plurality of frequency ramps in which information symbols embedded into respective ones of the frequency ramps is different. The receiver circuitry filters the information signal from the received radar waveform utilizing a group delay function that approximates a relationship between beat frequency and time delay of the received radar waveform.

A method-based embodiment is directed to an approach carried out by at least one of multiple radar devices being used in a radar-communication system, each including radar device including radar communication circuitry. A FMCW radar signal having an information signal embedded into a radar waveform is received and a relationship between beat frequency magnitude and time delay is indicated therein. The information signal is filtered from the FMCW radar signal by applying a group delay function based on the relationship between beat frequency magnitude and time delay and filtered FMCW radar signal is processed detect a remote object and/or characteristics thereof. In certain embodiments, a FMCW radar signal having a second information signal embedded into a radar waveform is received from another of the multiple radar devices and data from the second information signal is extracted.

In a particular embodiment, communications are effected between first and second ones of the multiple radar devices by embedding a plurality of frequency ramps with multiple information symbols in one of the radar devices, with the information symbols embedded into respective ones of the frequency ramps being different. The other one of the multiple radar devices removes the information signal from the FMCW radar signal by applying a filter with a group delay function that approximates the relation between beat frequency and a time delay of the transmitted FMCW radar signal.

Figure 1:
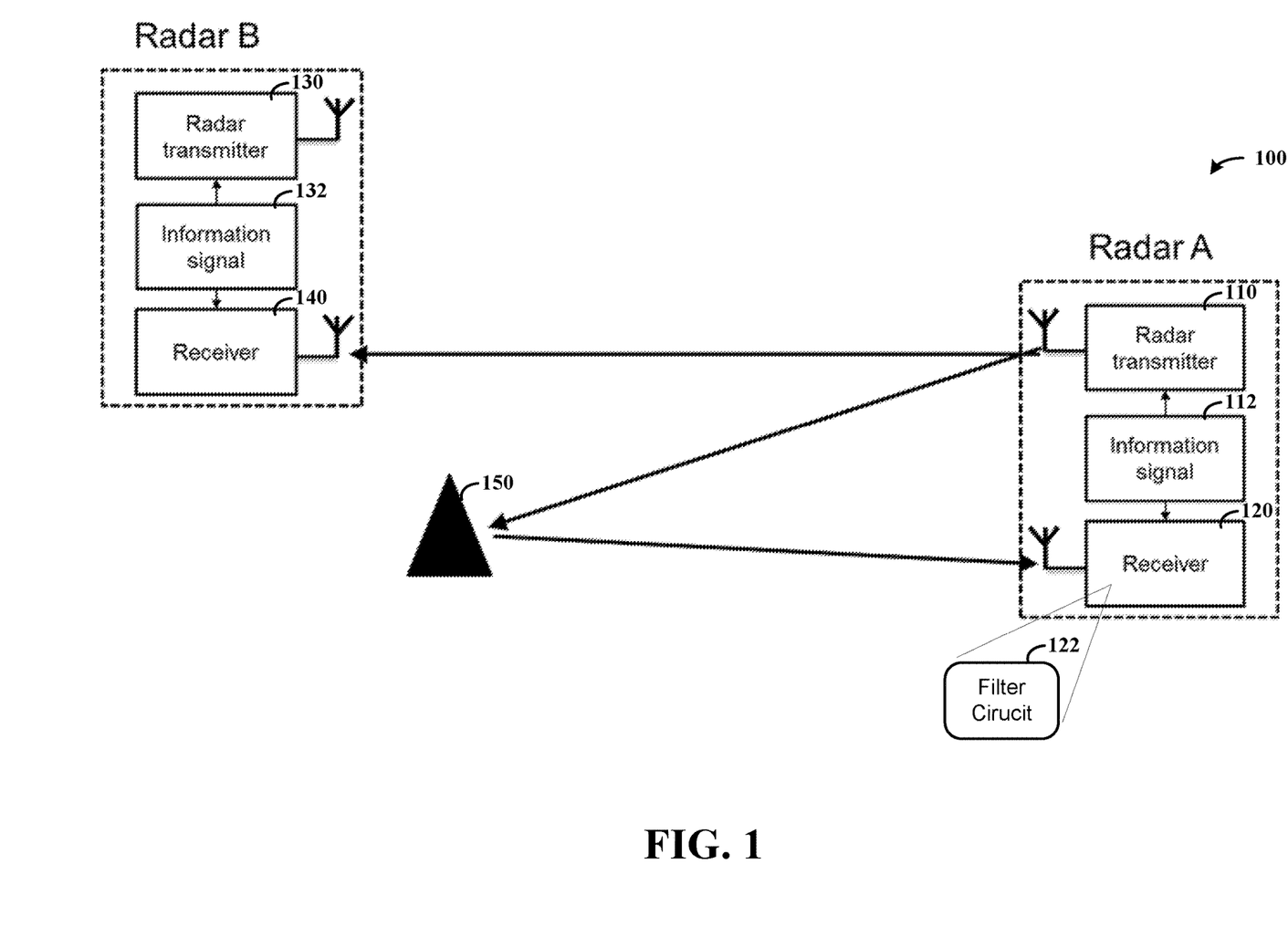
FIG. 1 shows a system-level diagram illustrating an example radar-communication apparatus and approach, in accordance with the present disclosure.

Turning now to the Figures, FIG. 1 shows an apparatus 100 as may be implemented in accordance with one of more embodiments. The apparatus includes a radar transmitter 110 and a receiver 120 having a filter circuit 122. The radar transmitter 110 embeds an information signal 112 into a radar signal that is transmitted as shown. When the radar signal reflects off of an object 150, the receiver 120 detects the reflection and the filter circuit 122 filters the information signal from the reflection and processes the reflection to ascertain distance to the object.

The signal transmitted by the radar transmitter 110 can further be detected by a remote receiver for communicating the embedded information signal therein. For instance, the radar transmitter 110 (at Radar A) may communicate with another radar (Radar B) having a receiver 140 configured to receive the radar signal and extract the embedded data therefrom. The other radar may similarly include a radar transmitter 130 that also embeds information signal 132 into radar transmissions, with the receiver 140 being configured to remove the embedded information signal from reflections of the radar transmissions for ascertaining object distance. Certain embodiments are directed to an apparatus/system including both Radar A and Radar B. In certain contexts, the respective radars are implemented in vehicles for vehicle-to-vehicle communication and detection of objects such as object 150. In various contexts, the apparatus 100 acts simultaneously as a radar device and a communication device in which loss of radar performance due to degeneration by an embedded information signal is mitigated.

Figure 2:
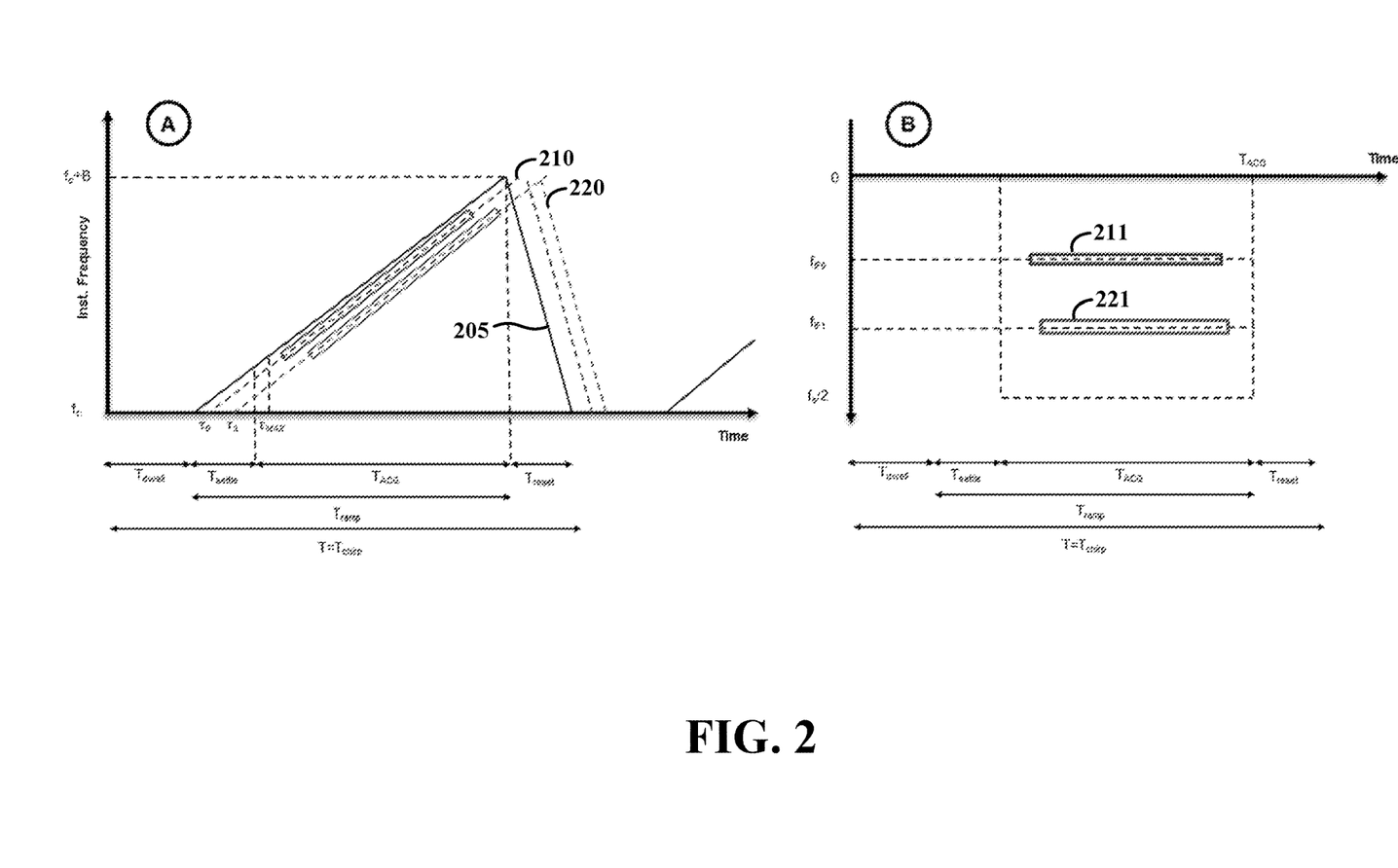
FIG. 2 shows respective plots a communication signal embedded in a radar signal, and processing of the communication signal, in accordance with the present disclosure.

FIG. 2 shows respective plots of a communication signal embedded in a radar signal at A and processing of the communication signal at B, in accordance with the present disclosure. Chirp 205 is shown without modulation used for de-ramping, and two reflected signals 210 and 220 at different ranges and having a communication signal embedded therein. At B, a spectrogram of the signal is shown after a de-ramping procedure with signal 211 corresponding to reflected signal 210 and signal 221 corresponding to reflected signal 220.

In certain embodiments, each single chirp is sampled within an acquisition window. The starting point of the acquisition window is chosen in such a way that the base-band signal is present the whole acquisition time Tacq., i.e., t∈[τmax; T], where τmax depends on the maximum round trip daily time expected for radar operation. The overall acquisition time Tacq is therefore given as Tacq=T−τmax.

Within each acquisition time, N samples are taken from each chirp. The radar emits M chirps and stores the sampled chirps in form of a matrix y[m,n]:

$$y[m, n] = \exp\left(j\left(-2\pi\left(\frac{f_B + f_D}{f_s}n + f_D m + \gamma\right) + \psi\left(\frac{n}{f_s} - \tau_m, I_m\right)\right)\right) + w\left(\frac{n}{f_s} + mT_{chirp}\right)$$

where fB is the beat frequency, fD is the Doppler frequency, γ is the residual phase comprising all constant phase terms, n and m represent the fast and slow time indexes, Tchirp is the chirp time interval. In addition, τ_M,I_m represents the time delay and the information sequence of the mth chirp. The communication signal I is known at the radar receiver. In various automotive radar implementations, both the transmitter and receiver may be co-located on the same printed circuit board (PCB) or in the same integrated circuit (IC). The beat frequency of each single chirp within the considered system cycle is given by the range at the beginning of the corresponding chirp (fB,m=ατm). The beat frequency at the beginning of an mth chirp may be given by alpha*tau(M)=alpha*(tau(M=0)+M*Tchirp*V) with V being the relative velocity of the target. The beat frequency may remain constant during the chirp sequence, under which conditions alpha*tau(M)=alpha*tau(M=0).

In various implementations involving a fast chirp, and due to the fact than α»fc, the beat frequency depends on the target range. Target velocity can be neglected. This property can be used to align the communication signal (also when multiple targets are considered) and equalize it. The summation of received signals can be split, each with its own delay, and each (sub) received signal is delayed appropriately. These signals are multiplied with the complex conjugate of the information signal for filtering/removing the information signal. When the information signal is removed from the received signal, standard radar processing can be applied. In this context, the matched filter may be split into three parts: de-ramping in the analog domain, matched filtering with the information signal, and Fourier transformation. In the second part, the matched filtering may be implemented by delaying the received signal rather than the transmitted signal. The summation may be carried out with a matched filtering approach that is part of the Fourier transformation.

In various contexts, splitting of the received signal into sub received signals, each with its own delay, can be avoided. Utilizing a time delay equal to a linear phase shift in the frequency domain, each sub received signal has its own beat frequency and the filter approximates a linear frequency shift over a frequency range roughly equal to the bit rate of the information signal. Where the time delay is variable (e.g., a continuous variable) delays may not be multiples of the bit rate, and phase compensation is used at the beat frequency and slowly deviating from an ideal linear transfer at frequencies offset from the beat frequency.

Such an all-pass filter with a linear group delay proportional to the beat frequency may be applied to all the received chirps. The group delay can be written as:

$$\tau_{group\ delay}(\omega) = \frac{\Omega_B}{2\pi\alpha}$$

where $\Omega_B = 2\pi f_B$. Considering that the group delay is the negative derivative of the phase response ∠H(Ω), the phase response can be retrieved by solving the following differential equation:

$$-\frac{d\angle H(\Omega)}{d\Omega} = -\frac{\Omega}{2\pi\alpha}$$

$$\angle H(\Omega) = \frac{\Omega^2}{4\pi\alpha} + k$$

where k is a constant that can be set to 0 without loss of generality. Considering normalizing by the sampling frequency fs ($\Omega=\omega f\_s$) and discrete phase values ($\omega=2\pi k/N$ where k=0:1:N−1 and N is the number of samples in the fast time), the phase response of the filter is:

$$\angle H\left(\frac{2\pi k}{N}\right) = \frac{\pi f_s}{BN}k^2$$

where $0 \leq k \leq N-1$, and N is the number of samples within the fast time.

Figure 3:
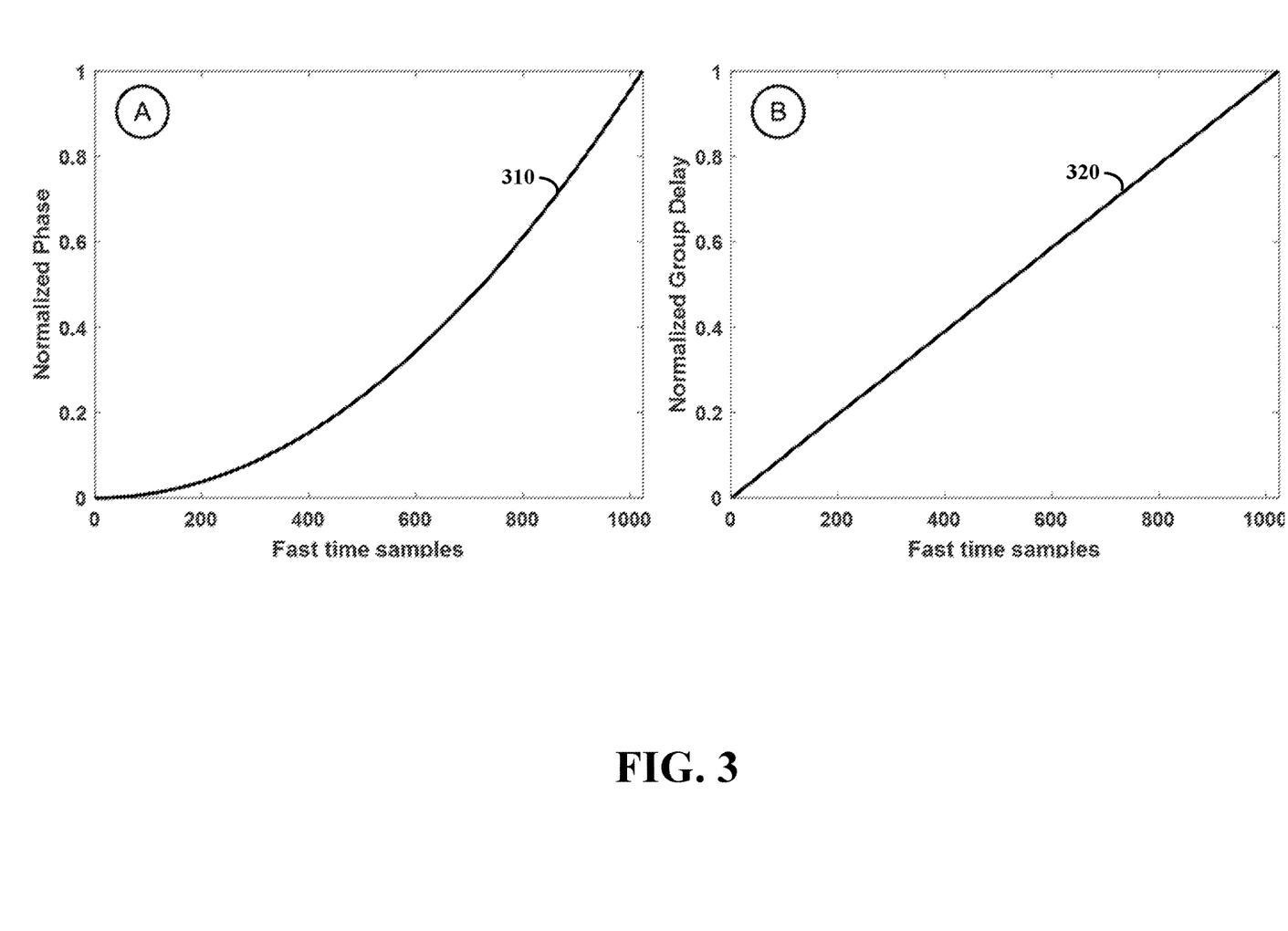
FIG. 3 shows plots of normalized filter phase response, in accordance with the present disclosure.

FIG. 3 shows plots of normalized filter phase response, in accordance with the present disclosure. Plots 310 (at A) and 320 (at B) are respectively shown for normalized phase and normalized group delay (e.g., B=1 GHz, N=1024, and fs=40 MHz).

Figure 4:
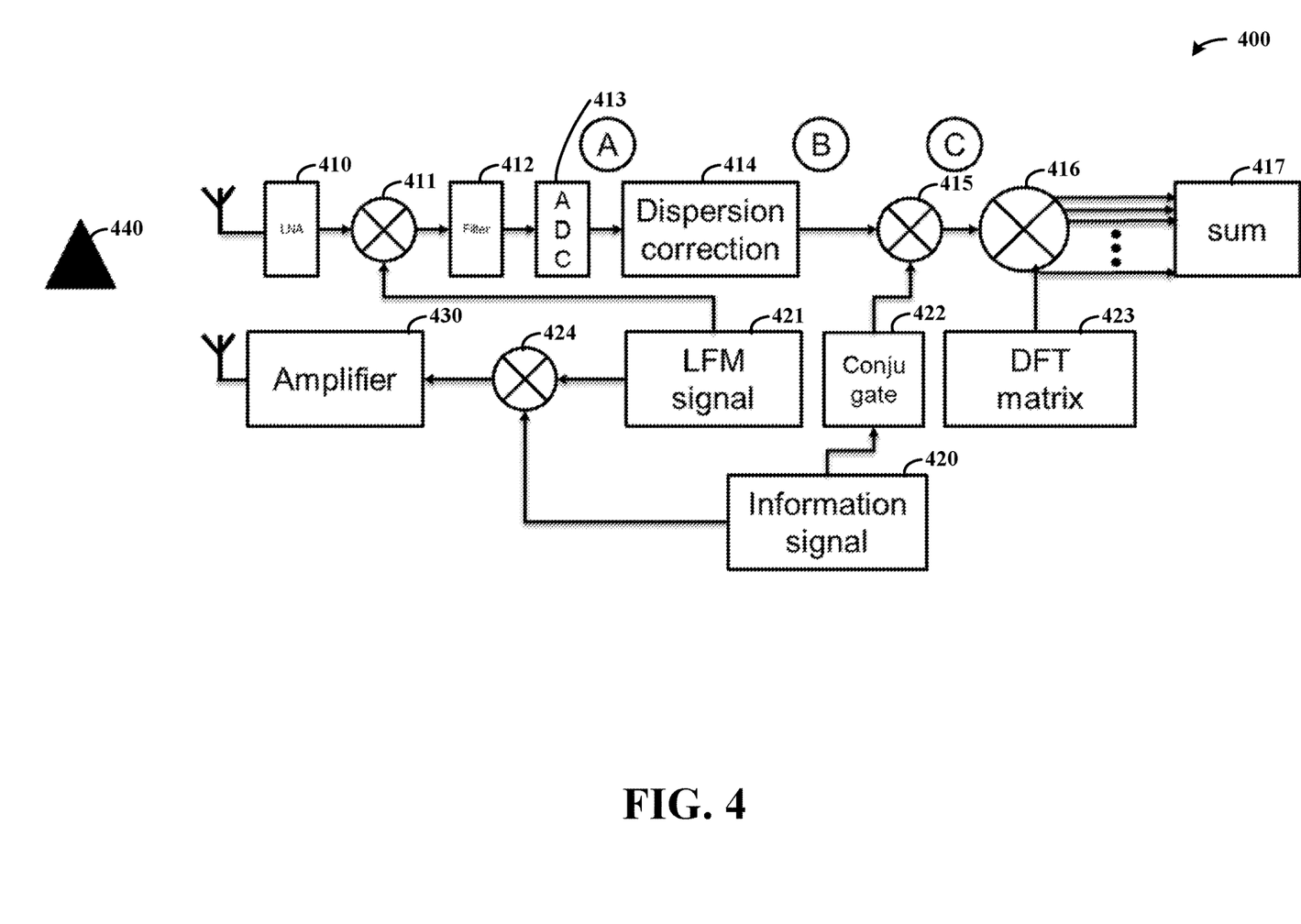
FIG. 4 shows a joint radar-communication apparatus with dispersion correction filter, as may be implemented in accordance with the present disclosure.

FIG. 4 shows a joint radar-communication apparatus 400 with a dispersion correction filter 414, as may be implemented in accordance with one or more embodiments. On the transmitter side a LFM signal is generated at 421 and phase shifted a number of times per frequency ramp where the duration of a phase shift is much longer than the round-trip time of flight of the signal, for embedding an information signal 420 at 424. Amplifier 430 amplifies the LFM signal with the information signal embedded therein and transmits the signal.

On the receiver side, the transmitted signal reflects from object 440, is received and amplified by LNA 410, down-converted with the same LFM signal at 411, filtered at 412, then digitized by ADC 413. Block dispersion correction at 414 may utilize an all pass filter as characterized above, which can be realized by performing a Fourier transformation, applying a quadratic phase shift over frequency, and then applying an inverse Fourier transformation. Other, time domain, filters may be implemented, using the same group delay behavior. A conjugate of the information signal is generated at 422 and applied to the output of dispersion correction at 415, for filtering the information signal. A discrete Fourier transform (DFT) matrix at 423 is utilized at 416 for further radar processing and summation at 417 for ascertaining distance to the object 440.

Figure 5:
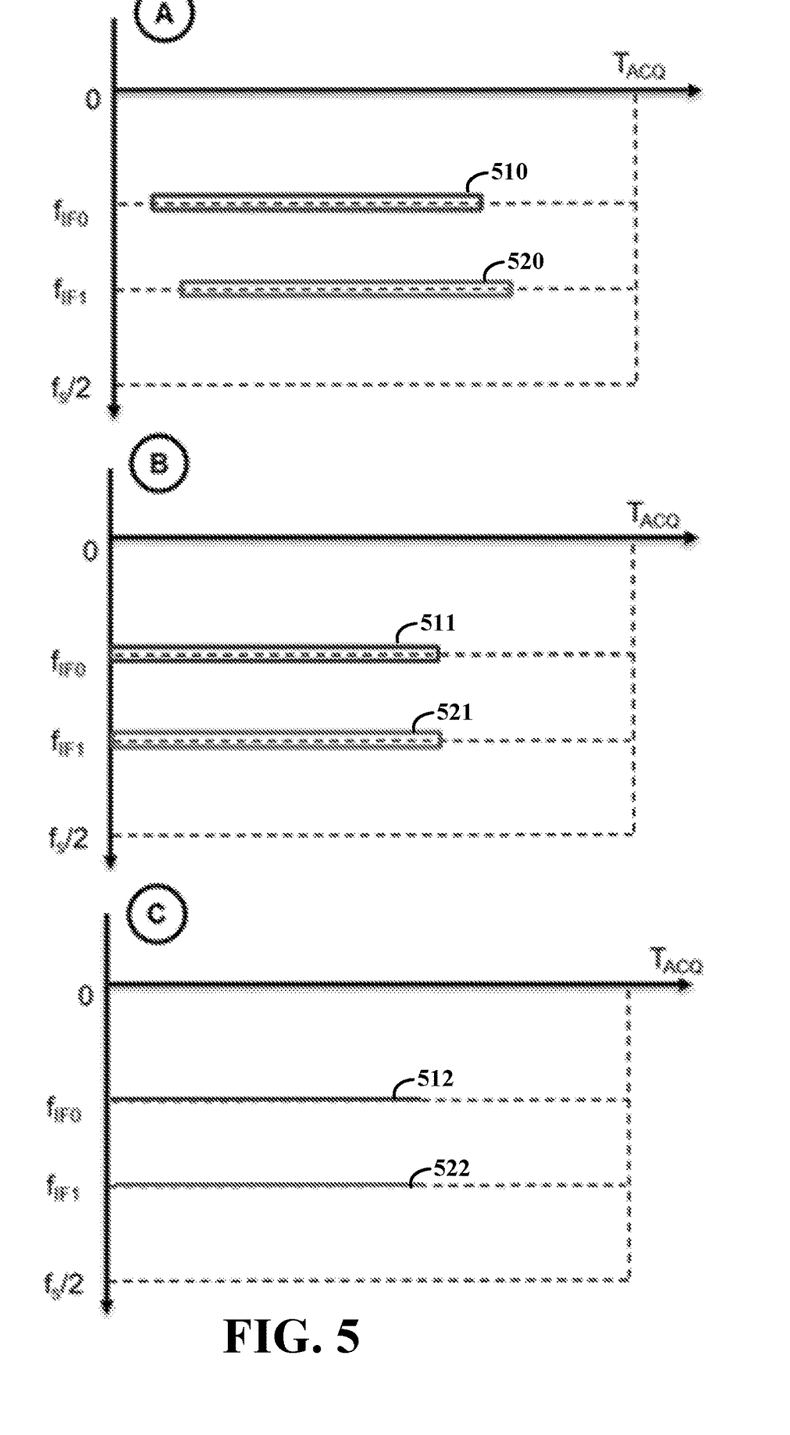
FIG. 5 depicts spectrograms of processed radar signals, in accordance with the present disclosure.

FIG. 5 depicts spectrograms of processed radar signals, in accordance with one or more embodiments. The spectrograms A, B and C may be taken at points A, B and C of FIG. 4, and is characterized in the following as such. At point A the signal is the summation of two signals 510 and 520, for the case of two reflectors. Each signal oscillates at its own beat frequency, occupies a part of the spectrum according to the bit rate, and experiences a different time delay. At point B the time delays have been equalized for signals 511 (from 510) and 521 (from 520), but the signal still occupies a spectrum according to the bitrate. At point C the information signal has been removed from each of signals 512 (from 511) and 522 (from 521) by derotating the phase of each signal the same amount as it was rotated in the transmitted signal. As the information signal is removed, the signal occupies a very small part of the spectrum around the beat frequencies. After this, a Fourier transformation such as a Fast Fourier Transformation (FFT) may be carried out. Further signal processing can be executed to obtain information about a target range, velocity and/or angle.

Figure 6:
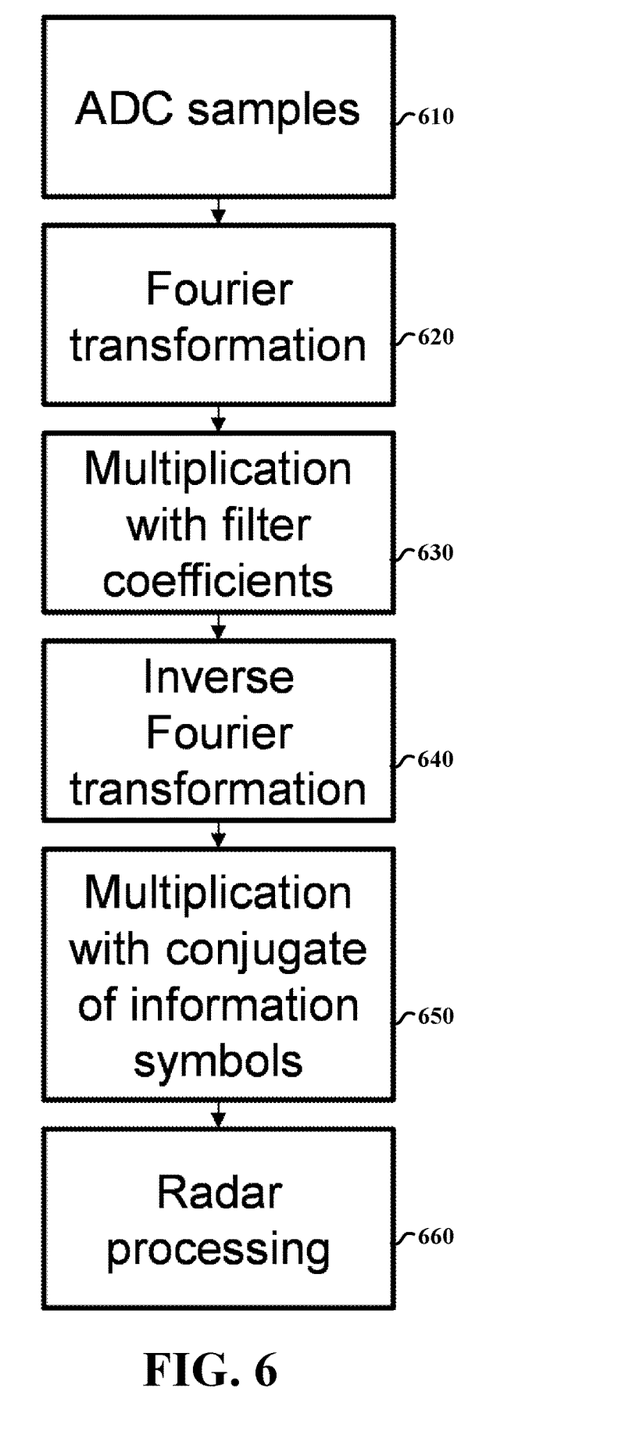
FIG. 6 is a signal processing flow diagram, in accordance with the present disclosure.

FIG. 6 shows a flow diagram, in accordance with the present disclosure. At block 610, ADC samples are acquired for radar data, and a Fourier transform is applied to those samples at block 620, which allows retrieving of a time delay to beat frequency information (e.g., for targets above a noise level). In this context, the samples may represent different reflections of a source transmission arriving from different reflectors located at different positions, with signals from reflectors that are further away exhibiting a longer time of flight and a higher oscillation frequency than a signal arriving from a closer reflector (shorter time of flight), with a linear relationship. This is followed by multiplication of the samples with filter coefficients at block 630, which aligns all of the target delays as part of a delay compensation process. At block 640, the results of the multiplication are transformed with an inverse Fourier transformation to retrieve the beat frequency to time delay information, and then multiplied with a conjugate of the information symbols at block 650 for removing the information from the time domain radar signal. At block 660, the remaining (filtered) radar signal is then processed for radar functions.

Referring again to FIG. 6, a more particular embodiment is implemented as follows, in which two signal reflections are obtained from respective targets located at different distances from a transmitter/receiver (or transceiver). One such signal reflection is obtained at an oscillation frequency of $F_{b2}$, which experiences a delay, $\tau$, relative to an oscillation frequency of the other signal reflection ($F_{b1}$). This delay has a fixed relationship as $$F_{b2} = \tau\mu = \frac{2R}{c_0}\frac{B}{T}.$$

The time delay of both signals is removed in the frequency domain where a time delay is equal to a linear phase shift over frequency equal to $2\pi f\tau$, with $$f = \frac{F_s}{N}n$$

being a fraction of the sampling frequency. A phase correction at frequency index n is implemented as $$2\pi\frac{F_s}{N}n\frac{2R(n)}{c_0}$$

where R(n) is the distance corresponding to index n. That distance is found from index n as $$\frac{F_s}{N}n = \frac{2R(n)}{c_0}\frac{B}{T} => R(n) = \frac{c_0 T}{2B}\frac{F_s}{N}n.$$

A phase correction is implemented as $$2\pi\frac{F_s}{N}n\frac{T}{B}\frac{F_s}{N}n.$$

Time delay correction is implemented, varying with distance, and exploits the relationship between the time delay and the center frequency of the received signal spectrum for all reflections. The phase changes quadratically over frequency and is correct for the spectrum center of each reflected signal.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the specification (including claims) connote a plain meaning in the art unless otherwise indicated. As examples, the specification describes and/or illustrates aspects useful for implementing the claimed disclosure by way of various circuits or circuitry which may be illustrated as or using terms such as blocks, modules, device, system, unit, controller, transmitter, receiver, filter circuit, and/or other circuit-type depictions (e.g., reference numerals 110, 130, 120, 122, 140 of FIG. 1, and componentry in FIG. 4 may depict a block/module as described herein). Such circuits or circuitry are used together with other elements to exemplify how certain embodiments may be carried out in the form or structures, steps, functions, operations, activities, etc. For example, in certain of the above-discussed embodiments, one or more receivers/receiver circuitry or other components are or include discrete logic circuits or programmable logic circuits configured and arranged for implementing these operations/activities, as may be carried out in the approaches shown in FIGS. 1-6. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein (e.g., in connection with FIG. 6 and/or in other discussion above) used by the programmable circuit to perform the related steps, functions, operations, activities, etc. Depending on the application, instructions (and/or configuration data) can be configured for implementation in logic circuitry, with the instructions (whether characterized in the form of object code, firmware or software) stored in and accessible from a memory (circuit). As another example, where the specification may make reference to a "first [type of structure]", a "second [type of structure]", etc., where the [type of structure] might be replaced with terms such as "receiver," "transmitter," "circuit", "circuitry" and others, the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to receive . . . " is interpreted as "circuit configured to receive . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, signals may be filtered in radar systems employing approaches other than an FMCW system as characterized herein, or in non-radar systems. As another example, different types of modulation may be utilized to both embed data signals and filter those data signal from a received waveform. Such modifications do not depart from the true spirit and scope of various aspects of the disclosure, including aspects set forth in the claims.

What is claimed is:

1. An apparatus comprising:
    receiver circuitry to receive a FMCW radar signal having an information signal embedded into a radar waveform and to ascertain or approximate a relationship in the FMCW radar signal between beat frequency magnitude and time delay;
    a filter processing circuit to filter the information signal in the FMCW radar signal by applying a group delay function based on the relationship between beat frequency magnitude and time delay; and
    signal processing circuitry to detect a remote object by using the filtered FMCW radar signal.

2. The apparatus of claim 1, wherein the signal embedded into the radar waveform includes a plurality of frequency ramps with multiple information symbols embedded into each single frequency ramp, the information symbols embedded into respective ones of the frequency ramps being different.

3. The apparatus of claim 1, further including transmitter circuitry to embed information signals into a radar waveform having plurality of frequency ramps by embedding multiple information symbols into each single frequency ramp, the information symbols embedded into respective ones of the frequency ramps being different.

4. The apparatus of claim 1, further including transmitter circuitry to generate and transmit the FMCW radar signal to communicate the information signal embedded in the radar waveform to remote receiver circuitry and to provide the FMCW radar for receipt by said receiver circuitry for ascertaining distance.

5. The apparatus of claim 1, wherein the filter processing circuit is to filter the FMCW radar signal by removing the information signal from the FMCW radar signal.

6. The apparatus of claim 1, wherein the signal processing circuitry is further to apply a phase-derotation process, based on the information signal, to an output from the filter processing circuit, and further including radar processing circuitry to provide radar signaling analysis of the output from the filter processing circuit after application of the phase-derotation process.

7. The apparatus of claim 1, wherein the information signal is embedded into the radar waveform by phase coding the information signal.

8. The apparatus of claim 1, wherein the apparatus is a radar-communication system including a first radar device having the receiver circuitry and the filter processing circuit, and including a second radar device, at least one of the first radar device and the second radar device having full-duplex radar communications circuitry.

9. The apparatus of claim 1, wherein
    the apparatus is a radar-communication system including a first radar device and a second radar device including signal-receiving circuitry; and
    the first radar device includes the receiver circuitry, the filter processing circuit and a signal-transmission circuit to transmit another FMCW radar signal concurrently causing the first radar device to respond by detecting the object and causing a transmission signal to be sent to the second radar device.

10. The apparatus of claim 1, wherein the FMCW radar signal includes modulation periods which are longer than an expected round-trip delay time of radar echoes detectable by the signal processing circuitry, and wherein the filter processing circuit is further to effect interference cancellation based on a phase of each of multiple FMCW sweeps in a series of frequency modulation ramps according to mutually orthogonal phase code sets.

11. The apparatus of claim 1, wherein the information signal in the FMCW radar signal is associated with communication symbol durations, each of which is longer than an expected round-trip delay time of radar echoes detectable by the signal processing circuitry, and wherein a beat frequency manifests in the frequency spectrum of a baseband signal of the FMCW radar signal and is proportional to an expected round-trip delay time of radar echoes.

12. The apparatus of claim 1, wherein the filter processing circuit and the signal processing circuitry are to process the FMCW radar signal based in part on a time delay relating to expected round-trip delay time of radar echoes corresponding to a linear phase shift in terms of frequency domain analysis.

13. The apparatus of claim 1, wherein the group delay function is based on the beat frequency magnitude being related to a linear group delay, and wherein the filter processing circuit is further to apply the group delay function to all chirps associated with the received FMCW radar signal.

14. A radar-communication apparatus comprising:
transmitter circuitry to embed an information signal into a radar waveform, and to transmit the radar waveform with the information signal embedded therein; and
receiver circuitry to:
receive the radar waveform as transmitted from the transmitter circuitry and reflected from an object,
filter the information signal from the received radar waveform, based on characteristics of the transmitted radar waveform including an ascertained or approximated relationship between beat frequency and time delay of the received radar waveform, therein providing a filtered radar waveform, and
detect a distance characteristic of the object using the filtered radar waveform.

15. The radar-communication apparatus of claim 14, wherein the receiver circuitry is coupled to the transmitter circuitry for receiving information depicting a characteristic of the transmitted radar waveform, and to filter the information signal based on the characteristic of the transmitted radar waveform.

16. The radar-communication apparatus of claim 14, wherein the receiver circuitry is to receive radar waveforms transmitted from remote transmitters that also embed an information signal into a radar waveform, and to process the waveforms transmitted from the remote transmitters to extract data in the information signal from each of the remote transmitters.

17. The radar-communication apparatus of claim 14, wherein:
the transmitter circuitry is to embed the information signal into the radar waveform by embedding multiple information symbols into each of a plurality of frequency ramps, the information symbols embedded into respective ones of the frequency ramps being different; and
the receiver circuitry is to filter the information signal from the received radar waveform utilizing a group delay function that ascertains or approximates the relationship between beat frequency and time delay of the received radar waveform.

18. A method performed by at least one of multiple radar devices being used in a radar-communication system, each including radar device including radar communication circuitry, the method comprising:
receiving a FMCW radar signal having an information signal embedded into a radar waveform and, in response, ascertaining or approximating a relationship in the FMCW radar signal between beat frequency magnitude and time delay;
filtering the information signal from the FMCW radar signal by applying a group delay function based on the relationship between beat frequency magnitude and time delay; and
signal processing the FMCW radar signal with the information signal filtered therefrom to detect a remote object.

19. The method of claim 18, further including receiving a FMCW radar signal having a second information signal embedded into a radar waveform from another of the multiple radar devices, and extracting data from the second information signal.

20. The method of claim 18,
further including communicating with a first one of the multiple radar devices by, in a second one of the multiple radar devices, embedding a plurality of frequency ramps with multiple information symbols, the information symbols embedded into respective ones of the frequency ramps being different; and
wherein filtering the information signal from the FMCW radar signal is carried out by the second one of the multiple radar devices and includes removing the information signal from the FMCW radar signal by applying a filter with a group delay function that approximates the relation between beat frequency and a time delay of the transmitted FMCW radar signal.

* * * * *